Patented Mar. 17, 1931

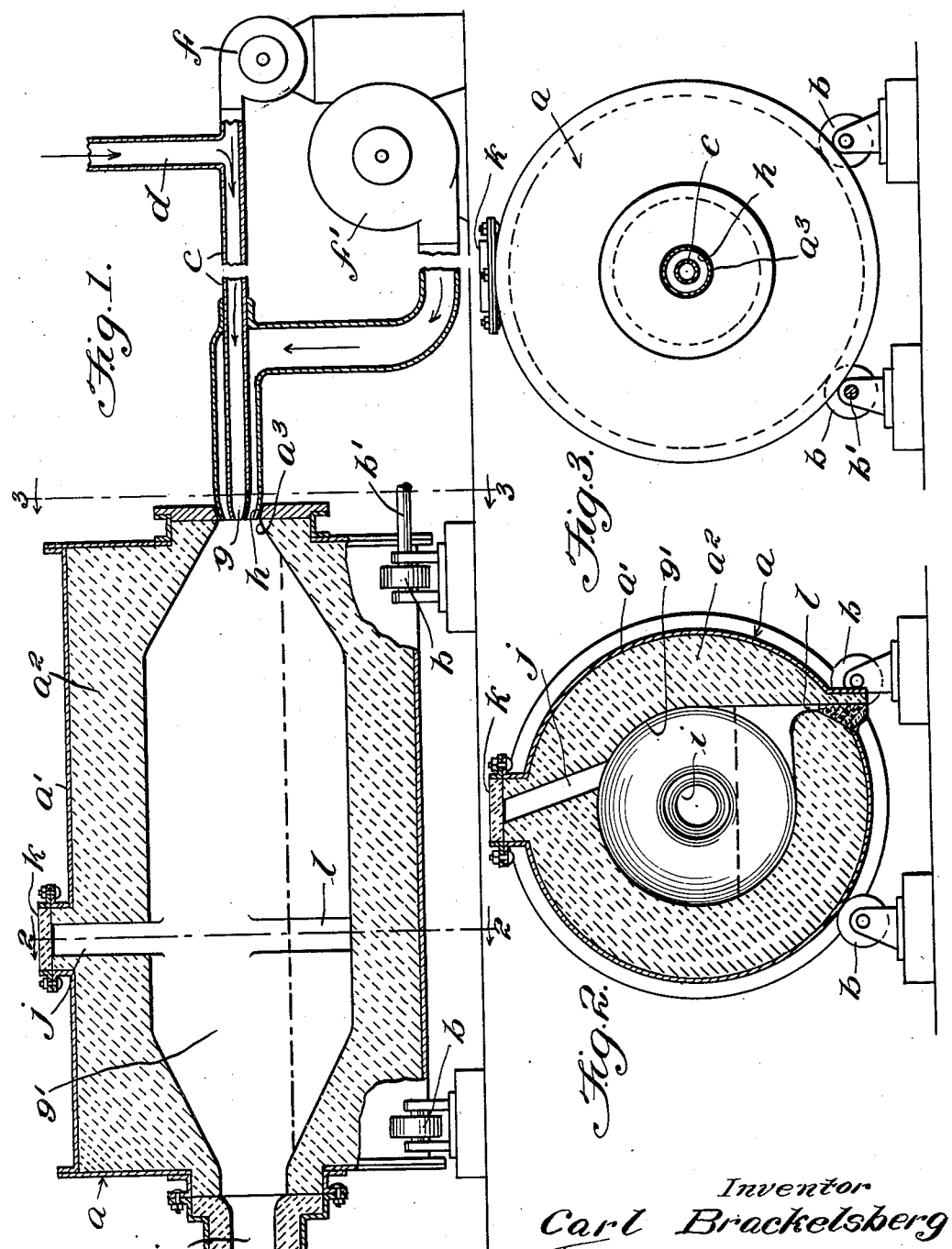

1,797,125

UNITED STATES PATENT OFFICE

CARL BRACKELSBERG, OF MILSPE, GERMANY

METHOD OF SMELTING METAL

Application filed April 18, 1927, Serial No. 184,698, and in Germany March 9, 1927.

The present invention relates to a method of smelting for the production of iron and iron alloys, and particularly to a method of smelting employing a rotary melting furnace and coal dust as fuel, in such manner as to adapt such furnaces to serve as efficient substitutes for the universally used cupola furnaces in the melting of iron and like metals.

Heretofore, all attempts to fire such rotary melting furnaces with coal dust have proved unsatisfactory for several reasons, among them that when the operation is carried on with fuel feeding apparatus of a certain type, a considerable proportion of the ashes of combustion of the fuel is deposited upon the surface of the molten metal in the form of a lava-like layer acting as an insulator and thereby retarding the melting process, and, as the metal absorbs impurities from this layer, an inferior grade of metal is produced. In an attempt to do away with this objection, it has been proposed to use a type of apparatus in which a special combustion chamber is arranged outside the furnace and communicating with the mouth thereof, in which chamber the combustion of the greater part of the coal dust and settling of the ashes is caused to take place. This type of apparatus reduces to some extent the amount of ashes entering the furnace and deposited upon the surface of the metal, but the amount of ashes deposited is still objectionable for the production of metal of high quality, while at the same time, as the greatest amount of heat is generated in this ante chamber, and at a point remote from the melting chamber of the furnace, a large proportion of this heat is dissipated and causes premature destruction of the walls of the ante chamber. The loss of this heat also prevents the melting chamber of the furnace from being maintained at a sufficiently high temperature for a melt within a reasonable period of time, in proportion to the amount of fuel consumed, the melting operation being unduly prolonged and the expense of operation of the furnace thereby increased. Attempts to use fuel and fuel feeding means of this character in a horizontal rotary furnace for iron and iron alloy smelting operations for the aforesaid reasons have not proved a practical success.

The present invention has for its object to obviate the afore-named disadvantages by effecting the combustion of the fuel dust directly in the melting chamber of the furnace, and introducing the fuel dust and the combustion air under such relative pressures or velocities as to cause the ashes of combustion upon formation to be carried along in the combustion space above the metal and discharged from the furnace while still under the buoying or flotation influence of the air blast, whereby the ashes are prevented from falling into the metal. By thus burning the fuel in the melting chamber itself all of the heat developed from the combustion of the fuel is concentrated within the furnace and caused to directly act upon the metal bath and the furnace wall, without causing damage to the latter, because, owing to the continuous rotation of the furnace, the highly heated wall portions successively come below and transfer their heat to the metal, and are thus deprived of a large proportion of the heat before again being subjected to the intense heat of the burning products. As a result, the metal being subjected to all the available heat of the fuel and kept free from ash deposits, the melting operation can be carried out in a very short time and in an economical manner. By blowing from the furnace the ashes of combustion as quickly as formed, so as to prevent any appreciable precipitation of ashes onto the metal, the surface of the metal is kept almost entirely free from deposits liable to seriously interfere with the proper heat exchange. In addition, owing to the shortened melting period, and the absence of intimate contact between the metal and any considerable portion of ashes, the taking up by the metal of chemical or other impurities from the ashes, will be prevented or reduced to the minimum and the quality of the metal product correspondingly improved.

In order to avoid the deposition of much ash in the furnace, in accordance also with the invention, coal-dust, such as anthracite coal dust, containing a low percentage of ash, preferably not more than 10-15 per cent, is preferably employed. It has also proved advantageous when carrying the new process into effect to employ a considerably higher air pressure than has hitherto been usual when firing with coal-dust, and, according to the invention, a pressure, for example of about 400 mm. of water, is employed for a furnace about 4 metres in length, whereas the ordinary air pressure when firing with coal-dust amounts to only about 10-12 mm.

Owing to the employment of a high pressure of this nature, on the one hand, the advantage is obtained that, owing to the high speed of flow, the gases of combustion carry practically all particles of ash with them out of the furnace through the outlet, so that no substantial amount of ash can be deposited in the furnace while, on the other hand, an extraordinarily intensive combustion is produced. Finally, in accordance also with the invention, the supply of fuel and air takes place in a special manner in that the coal dust is first blown out of a nozzle by means of a current of air at only a low pressure of about 10 mm. of water, and this mixture is then enveloped by a second current of air which enters the firing space at a considerably higher pressure, namely about 400 mm. for example.

In this way extraordinarily effective combustion and quick smelting of the charge becomes possible with a degree of economy not hitherto attained.

An apparatus for carrying out the new process is illustrated in the accompanying drawing, in which:

Fig. 1 is a vertical longitudinal section of the apparatus.

Fig. 2 is a transverse section on line 2—2 of Fig. 1.

Fig. 3 is a transverse section on the line 3—3 of Fig. 1.

In the drawing $a$ is the melting furnace, having an outer shell $a'$ and the refractory lining $a^2$ and which is mounted on rollers $b$ so as to be rotatable about its horizontal longitudinal axis. At one end the furnace is provided with a fuel inlet mouth or opening $a^3$, to which is fitted the apparatus for firing with coal dust. This apparatus consists essentially of a thin tube $c$ into which the coal dust is introduced from a suitable source of supply (not shown) through a branch tube $d$. By means of a blower $f$ or other source of compressed air supply, air at a pressure of about 10 mm. of water is blown, together with the coal dust, out of the nozzle $g$ directly through the furnace mouth into the melting chamber $g'$ of the furnace and the coal dust burned in suspension therein. The nozzle $g$ is enclosed by another nozzle $h$ through which air at a considerably higher pressure, namely about 400 mm. of water, is supplied from a blower $f'$ or other source of air supply. The current of air mixed with coal dust which is blown through the inner nozzle $g$ is enveloped thereby and carried forward during the smelting process at increased speed. The discharge of the gases of combustion and the particles of ash carried by them is effected through the ordinary waste gas outlet $i$ at the rear of the furnace.

By burning the fuel directly within the smelting chamber of the furnace, the heat from the gases of combustion will be concentrated therein, so that it will either come directly in contact with the metal or, by heat exchange, be transferred thereto from the walls of the revolving furnace. By this means the furnace wall may be heated intensely without causing injury thereto and premature destruction thereof, because, owing to the continuous rotation of the furnace, the highly heated wall portions successively come below and transfer their heat to the metal, and are thus deprived of a large proportion of the heat before again being subjected to the intense heat of the burning products. As a result, the metal being subjected to the direct heat of the fuel concentrated within the furnace, the melting operation can be carried out in a very short time and in an economical manner. By introducing with the fuel and its injecting or carrier blast of air supplied through nozzle $g$, a supplementary blast of air of higher pressure through nozzle $h$, this supplementary blast of air not only serves to ensure a supply of oxygen for the combustion of the fuel in suspension in the smelting chamber, but so augments the pressure of the carrier blast as to uniformly distribute the fuel throughout the melting chamber and to make the volumes and pressures of the combined blasts such as to support and maintain the ashes of combustion in suspension and prevent precipitation of the same and to sweep such ashes subtantially completely through the furnace and discharge the same through the exhaust outlet $i$. By blowing from the furnace the ashes of combustion so as to prevent any appreciable precipitation of ashes on the metal, the surface of the metal is kept almost entirely free from deposits liable to seriously interfere with the proper heat exchange. In addition, owing to the shortened melting period, and the absence of intimate contact between the metal and any considerable portion of ashes, the taking up by the metal of chemical or other impurities from the ashes will be prevented or reduced to the minimum and the quality of the metal product greatly improved.

The furnace is provided with the slag-hole *j* normally closed by a cover *k*, and the taphole or pouring spout *l*, which may be closed in any suitable manner when the furnace is being rotated. One of the rollers *b* is mounted on a driving shaft *b'* whereby power from a suitable source may be applied to oscillate or rotate the furnace.

It may be stated that the air pressures given are those suitable for use under certain given conditions and with a certain size of furnace, but that the flow of the gases through the furnace and the carrying out of the ashes is accomplished not only by the velocity of the gases at the burner, but also by the draft of the furnace stack. By properly designing the stack the air pressures, and particularly the supplementary blast pressure, may be reduced to reasonable degrees from those given.

I claim:—

1. The herein-described method of smelting metal in a horizontal rotary smelting furnace having a fuel inlet at one end an exhaust outlet for the spent fuel gases at its opposite end, by the use of powdered coal as fuel, in such manner as to prevent waste of heat and unduly rapid disintegration of the lining of the smelting chamber and the insulation of the metal from the heat and its contamination by the deposit of an undue amount of the ashes of combustion on the surface thereof, which method consists in injecting the powdered fuel by means of a main carrier air blast of comparatively high pressure through said fuel inlet into the smelting chamber of the furnace, burning the fuel in suspension directly within said smelting chamber so that portions of the evolved heat will be taken up by the metal charge, and other portions by the furnace lining above the horizontal plane of the surface of the charge constantly transmitting by the rotation of the furnace to the base of the charge the heat taken up by lining, and introducing with the fuel a supplementary combustion promoting blast of air of greater pressure than the carrier blast to ensure a supply of oxygen for the combustion of the fuel in suspension in the smelting chamber and to augment the pressure of the first-named blast so that the volumes and pressures of the combined blasts will be such as to support and maintain the ashes of combustion in suspension and prevent precipitation of the same and to sweep such ashes substantially completely through the furnace and discharge the same through the exhaust fuel outlet.

2. The method of operating rotatable drum furnaces for the melting of metals by the use of powdered coal as fuel, which consists in burning the fuel directly in the furnace melting chamber by the aid of combustion air of such volume and pressure as to cause the fuel to be burned in suspension and the ashes of combustion to be blown through the outlet of the furnace.

3. The method in accordance with claim 2 wherein the air pressure employed corresponds to the pressure of a column of water of substantially 400 mm.

In testimony whereof I affix my signature.

CARL BRACKELSBERG.